United States Patent
Shimada

(10) Patent No.: US 9,369,267 B2
(45) Date of Patent: Jun. 14, 2016

(54) COMMUNICATION RECEPTION WITH COMPENSATION FOR RELATIVE VARIATION BETWEEN TRANSMIT BIT INTERVAL AND RECEIVER SAMPLING INTERVAL

(71) Applicant: Texas Instruments Incorporated, Dallas, TX (US)

(72) Inventor: Mitsuru Shimada, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/271,854

(22) Filed: May 7, 2014

(65) Prior Publication Data

US 2015/0326386 A1    Nov. 12, 2015

(51) Int. Cl.
*H04L 7/00* (2006.01)
*H04L 7/033* (2006.01)

(52) U.S. Cl.
CPC .............. *H04L 7/033* (2013.01); *H04L 7/0087* (2013.01)

(58) Field of Classification Search
CPC .................................................... H04L 7/0012
USPC .......................................................... 375/355
See application file for complete search history.

(56) References Cited

U.S. PATENT DOCUMENTS

| | | | | |
|---|---|---|---|---|
| 6,628,212 | B1* | 9/2003 | Toutant | 341/70 |
| 2005/0265440 | A1* | 12/2005 | Sohn | 375/233 |
| 2008/0104481 | A1* | 5/2008 | Ito | 714/758 |
| 2012/0287855 | A1* | 11/2012 | Kishigami et al. | 370/328 |
| 2013/0039450 | A1* | 2/2013 | Huang et al. | 375/343 |

OTHER PUBLICATIONS

International Standards Organization, ISO 11898-1:2003(E), Road Vehicles—Controller Area Network (CAN), Part 1: Data Link Layer and Physical Signaling, Dec. 1, 2003, 46 pages.

* cited by examiner

*Primary Examiner* — Santiago Garcia
(74) *Attorney, Agent, or Firm* — Gregory J. Albin; Frank D. Cimino

(57) ABSTRACT

The effect of timing inaccuracy is compensated for in a communication receiver that receives a transmission of bits temporally separated by a bit interval. The compensation employs an oversampling clock whose frequency defines a sampling interval that is smaller than the bit interval, which bit interval is nominally a predetermined integer multiple of the sampling interval. The oversampling clock samples the received transmission to produce an incoming sample stream. The incoming sample stream is decoded by a plurality of different decoding operations to produce, respectively, a plurality of decoded sample streams. It is determined whether the received transmission is decodable from any of the decoded sample streams.

18 Claims, 2 Drawing Sheets

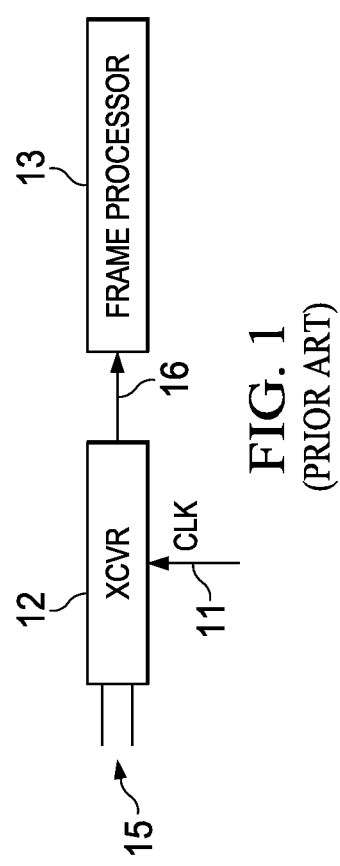
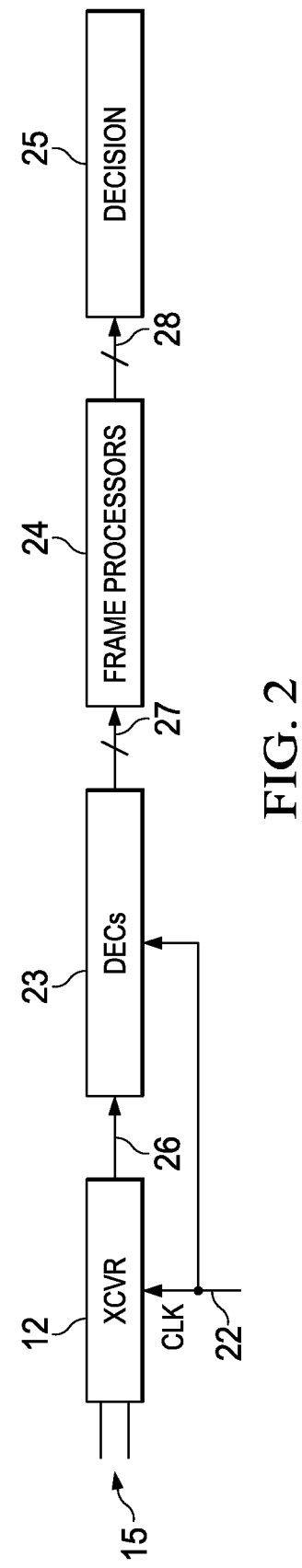

COMMUNICATION RECEPTION WITH COMPENSATION FOR RELATIVE VARIATION BETWEEN TRANSMIT BIT INTERVAL AND RECEIVER SAMPLING INTERVAL

FIELD

The present work relates generally to communications and, more particularly, to communication receivers that use a sample clock to sample incoming signals.

BACKGROUND

FIG. 1 diagrammatically illustrates a conventional CAN (Controller Area Network) receiver arrangement. (See also the International Standard, ISO 11898-1:2003(E).) A transceiver (XCVR) 12 includes a receiver portion that receives signaling from the CAN bus 15, and samples the signaling in accordance with a sampling interval defined by the frequency of a sampling clock 11 that is received at an input CLK. As a result of the sampling operation, the transceiver captures a stream of bit samples for a CAN frame that has been transmitted on the bus 15. The stream of bit samples is provided at 16 to a frame processor 13 that uses the bit samples to decode the CAN frame. Among other tasks, the frame processor 13 checks for and removes bits that were "stuffed" into the frame at the transmitter (also called de-stuffing), and performs a cyclic redundancy code (CRC) check for the frame. Based on the de-stuffing and CRC checking, the frame processor 13 decides whether or not the frame has been decoded successfully.

Due to various well-known characteristics of the CAN frame transmission protocol, the sampling clock 11 must typically have about a +/−2% frequency tolerance to ensure that the frame is sampled and decoded successfully. This level of sample clock accuracy typically requires either a crystal oscillator or post fabrication trimming, both of which disadvantageously increase manufacturing costs.

It is desirable in view of the foregoing to provide for compensating an insufficiently accurate sample clock in a communication receiver (such as, e.g., a CAN receiver).

BRIEF DESCRIPTION OF THE DRAWINGS

FIG. 1 diagrammatically illustrates a prior art communication receiver apparatus.

FIG. 2 diagrammatically illustrates a communication receiver apparatus according to example embodiments of the present work.

DETAILED DESCRIPTION

Figure 3:
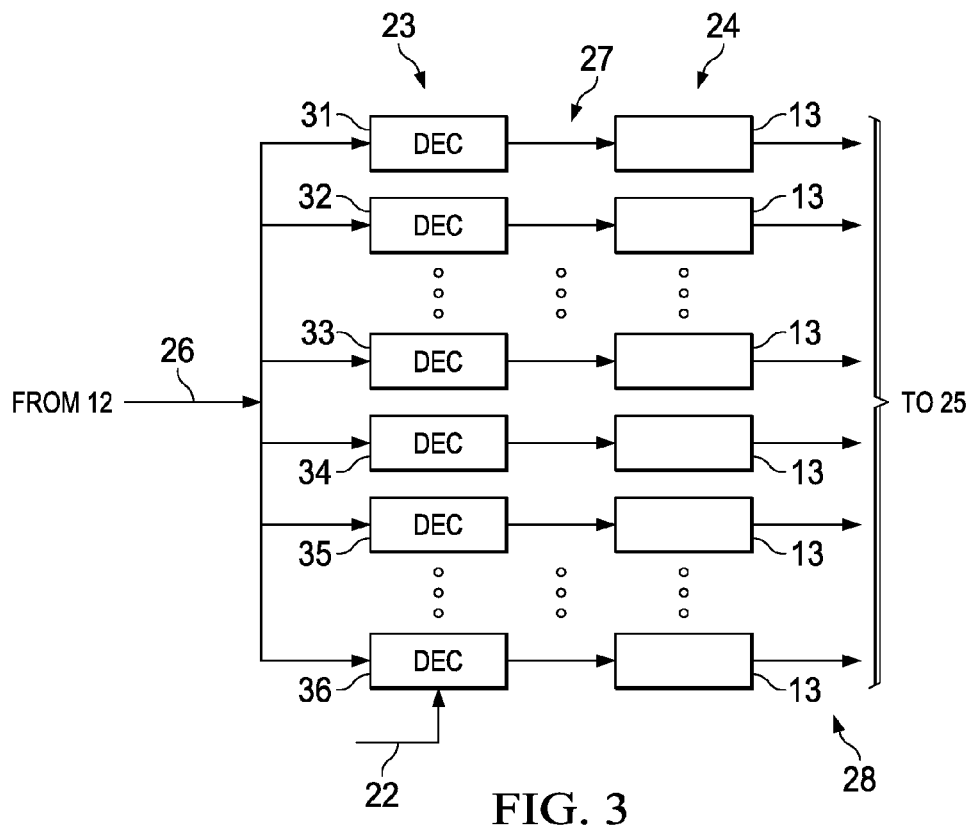
FIG. 3 diagrammatically illustrates the apparatus of FIG. 2 in more detail according to example embodiments of the present work.

Example embodiments of the present work are described below in connection with the prior art CAN receiver example. As will be apparent to workers in the art, however, the present work finds application in many communication receivers that would otherwise require an accurate and costly sample clock.

Referring again to FIG. 1, the sampling interval of the sample clock 11 nominally corresponds to a bit interval that temporally separates serially adjacent ones of the transmitted bits. Thus, when the sample clock 11 is at its nominal sampling frequency F, the sampling interval is the same as the bit interval, so each bit may be properly sampled. If, however, the actual frequency of the sample clock 11 drifts away from F (e.g., due to insufficient accuracy/frequency tolerance), sampling points may become temporally misaligned with transmitted bits, making proper sampling problematic.

FIG. 2 diagrammatically illustrates a communication receiver apparatus according to example embodiments of the present work. The receiver portion of transceiver 12 samples in response to a ×N oversampling clock 22 at the CLK input. The oversampling clock 22 has a frequency that is N times the frequency of the sampling clock 11 of FIG. 1 (i.e., N×F). The transceiver 12 (see also FIG. 1) receives the oversampling clock 22 at its CLK input, and samples the signaling on bus 15 in the same fashion as in the conventional example of FIG. 1, but at a sampling interval defined by the frequency of the oversampling clock 22 instead of the sample clock 11. With the oversampling clock 22, multiple (nominally N) sampling intervals occur during each bit interval. Hereinafter, the terms sample clock, sampling frequency and sampling interval are used with reference to the oversampling clock 22.

At 26, the transceiver 12 provides a stream of samples (incoming sample stream) to each of a plurality of decoders (designated as DECs in FIG. 2) in a decoding apparatus shown diagrammatically at 23. The outputs of the plurality of decoders 23, shown diagrammatically at 27, are provided respectively to a plurality of frame processors in a processing apparatus shown diagrammatically at 24. In some embodiments, each of the plurality of frame processors at 24 is a frame processor 13 as shown in FIG. 1.

Consider, for example, that the actual frequency of the oversampling clock 22 may, due to insufficient accuracy/frequency tolerance, vary from its nominal value N×F, and assume values given by:

$$(N \times F) \times (k/N), \quad (1)$$

where:
k=K, K+1, ... , K+(N−K−1), N, N+1, ... N+J;
J, K and N are non-zero integers;
K<N; and
1<J<K.

When k=N above, the oversampling clock 22 has frequency N×F, so the transceiver 12 produces N samples per bit interval. This is the nominal case. When, for example, k=K above, the oversampling clock 22 has frequency K×F, so the transceiver 12 produces K samples per bit interval. When, for example, k=N+J above, the oversampling clock 22 has frequency (N+J)×F, so the transceiver 12 produces N+J samples per bit interval. It can be seen that the value of k in expression (1) corresponds to the number of samples per bit interval produced by sampling with the oversampling clock 22, as its frequency varies. Each of the plurality of decoders at 23 in FIG. 2 is configured to correspond uniquely to one of the values of k, as described below.

FIG. 3 diagrammatically illustrates in more detail the plurality of decoders and the plurality of frame processors respectively shown at 23 and 24 in FIG. 2. Selected ones of the plurality of decoders (each designated by DEC in FIG. 3) are shown at 31-36. Each decoder is coupled to receive as input the incoming sample stream 26 and the oversampling clock 22. The decoder 31 corresponds to k=K, for K samples per bit interval, so decoder 31 passes only every Kth sample that it receives at 26 from the transceiver 12. The decoder 32 corresponds to k=K+1, for K+1 samples per bit interval, so decoder 32 passes only every (K+1)th sample that it receives. The decoder 33 corresponds to k=K+(N−K−1)=N−1, for N−1 samples per bit interval, so decoder 33 passes only every (N−1)th sample that it receives. The decoder 34 corresponds to k=N, for N samples per bit interval, so decoder 34 passes only every Nth sample that it receives. The decoder 35 corresponds to k=N+1, for N+1 samples per bit interval, so decoder 35 passes only every (N+1)th sample that it receives. The decoder 36 corresponds to k=N+J, for N+J samples per bit interval, so decoder 36 passes only every (N+J)th sample that it receives. Each of the decoders in the decoding apparatus 23 thus applies a different and unique decoding operation to the incoming sample stream 26. That is, each decoder at 23 decodes the incoming sample stream to produce a uniquely associated decoded sample stream corresponding to its unique decoding operation. The decoded sample streams produced by the decoders at 23 are designated at 27.

Some example embodiments use the following parameter values in expression (1) above: F=6 MHz, N=24, K=18 and J=3. As another example, some embodiments use: F=6 MHz, N=24, K=19 and J=4.

Each of the plurality of decoders shown at 23 in FIGS. 2 and 3 accounts for an associated variation of oversampling clock 22 from its nominal frequency N×F. (Decoder 34, with k=N, corresponds of course to the nominal case where the variation is zero.) As shown at 27 in FIG. 3, each of the decoders at 23 passes its decoded sample stream to a respectively corresponding frame processor 13 (see also FIG. 1). Each frame processor 13 attempts to decode the CAN frame from the received decoded sample stream using conventional CAN processing, including the aforementioned de-stuffing and CRC checking. If the de-stuffing and CRC checking is successful in any of the frame processors 13, then the corresponding frame is acknowledged at 25 as having been successfully decoded.

Each of the example configurations described above, namely, N=24, K=18 and J=3, and N=24, K=19 and J=4, provides ten parallel and independent processing paths or fingers (each including a decoder at 23 and a frame processor at 24) corresponding to ten possible frequencies of the oversampling clock 22. In some embodiments, the parameters in expression (1) above are selected such that the range of frequency coverage provided by each finger overlaps that of its frequency-adjacent neighbor finger(s). This ensures that at least one of the frame processors 13 can successfully decode the frame at any frequency that oversampling clock 22 may exhibit.

The arrangement shown in FIGS. 2 and 3 is scalable in accordance with the frequency tolerance of the oversampling clock 22. Some embodiments, for example, can compensate for +/−20% frequency tolerance. Providing additional digital logic for the decoders in decoding apparatus 23 and for the additional frame processors 13 (nine additional frame processors in the examples described above) is typically less costly than providing the oversampling clock 22 with a tight frequency tolerance, for example, +/−2%.

Still referring to FIGS. 2 and 3, some embodiments apply digital low pass filtering (not explicitly shown) to the incoming sample stream 26 to remove unwanted high frequency components. In some embodiments, a single filter is provided between the transceiver 12 and the decoders at 23. In some embodiments, each of the fingers includes its own filter, provided upstream of the associated decoder at 23.

Figure 4:
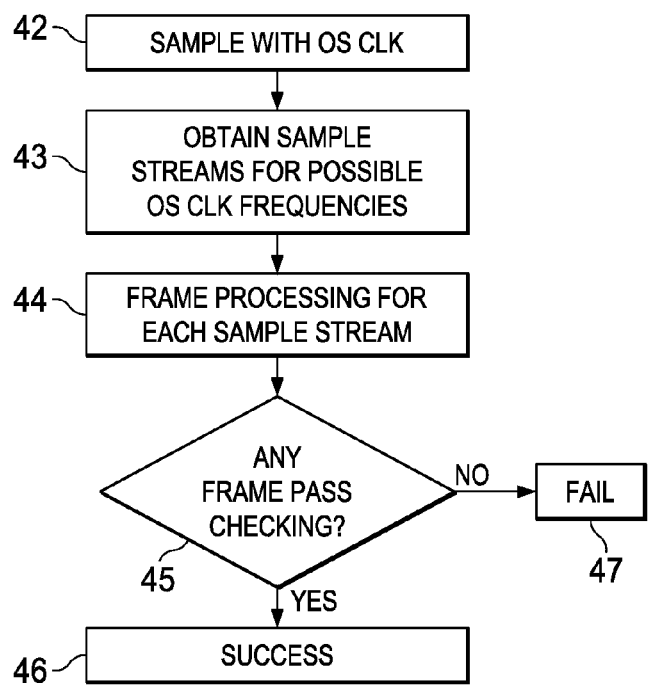
FIG. 4 illustrates operations that may be performed according to example embodiments of the present work.

FIG. 4 illustrates operations that may be performed according to example embodiments of the present work. In some embodiments, the receiver apparatus of FIGS. 2 and 3 is capable of performing the operations of FIG. 4. The incoming signaling is sampled in accordance with the oversampling clock (OS clk) at 42 to produce an incoming sample stream. At 43, sample streams corresponding to possible frequencies of the oversampling clock are obtained from the incoming sample stream (e.g., using the decoders at 23 in FIG. 3 in some embodiments). Frame processing is performed at 44 relative to each sample stream obtained at 43. It is determined at 45 whether any frame from any of the obtained sample streams passes the checks in its frame processing (e.g., de-stuffing and CRC checking in CAN embodiments). Any such frame is acknowledged at 46 as a successfully decoded frame. If, at 45, none of the frames passes the frame processing checks, then a frame decoding failure is determined at 47.

It should be evident to workers in the art that the techniques of the present work described above are similarly effective in situations where the communication receiver has an accurate sample clock with tight frequency tolerance, but receives frames that have been transmitted in accordance with a relatively inaccurate transmitter clock having a relatively relaxed frequency tolerance. In such cases, it is the timing (bit interval) of the transmitted bits, rather than the receiver's sample clock, that may drift appreciably relative to nominal timing. However, this is in effect the same problem as the aforementioned problem associated with an inaccurate sample clock, namely, temporal misalignment between transmitted bits and sampling points. Thus, the same techniques described above will also compensate for the inaccurate transmitter clock. It will be further appreciated that the timing misalignment problem may arise as a result of variations in both the transmitter clock and the receiver's sample clock. Indeed, any relative variation between the bit interval and the sampling interval gives rise to the timing misalignment problem, and may be compensated by the techniques of the present work described above.

Although example embodiments of the present work have been described above in detail, this does not limit the scope of the work, which can be practiced in a variety of embodiments.

What is claimed is:

1. A method of processing a received transmission of bits that are temporally separated by a bit interval, comprising:
   providing an oversampling clock whose frequency defines a sampling interval that is smaller than said bit interval, wherein said bit interval is nominally a predetermined integer multiple of said sampling interval;
   sampling, with a communication receiver apparatus, the received transmission in accordance with said sampling interval to produce an incoming sample stream;
   applying to the incoming sample stream, with the communication receiver apparatus, a plurality of different decoding operations to produce, respectively, a plurality of decoded sample streams; and
   determining, with the communication receiver apparatus, whether the received transmission is decodable from any of the decoded sample streams,
   wherein the decoded sample streams respectively correspond to different relative variations between said sampling interval and said bit interval.

2. The method of claim 1, wherein the decoded sample streams consist of samples separated by respectively different intervals in the incoming sample stream.

3. The method of claim 1, wherein said determining includes, for each of the decoded sample streams, attempting to decode the received transmission from the decoded sample stream.

4. The method of claim 3, wherein said attempting includes performing decoding with respect to each of the decoded sample streams in parallel.

5. The method of claim 3, wherein the received transmission is a transmission on a Controller Area Network (CAN) bus, and said attempting utilizes de-stuffing and cyclic redundancy code (CRC) checking.

6. The method of claim 1, wherein said relative variations are associated with variation in said sampling interval.

7. The method of claim 1, wherein said relative variations are associated with variation in said bit interval.

8. The method of claim 1, wherein said relative variations are associated with variations in both said sampling interval and said bit interval.

9. The method of claim 1, wherein the received transmission is a transmission on a Controller Area Network (CAN) bus.

10. An apparatus for processing a received transmission of bits that are temporally separated by a bit interval, comprising:
- a sample clock input for receiving an oversampling clock whose frequency defines a sampling interval that is smaller than said bit interval, wherein said bit interval is nominally a predetermined integer multiple of said sampling interval;
- a receiver coupled to said sample clock input and configured to sample the received transmission in accordance with said sampling interval to produce an incoming sample stream;
- a decoding apparatus coupled to said receiver and configured for applying to the incoming sample stream a plurality of different decoding operations to produce, respectively, a plurality of decoded sample streams; and
- a processing apparatus coupled to said decoding apparatus and configured for determining whether the received transmission is decodable from any of the decoded sample streams,
- wherein the decoded sample streams respectively correspond to different relative variations between said sampling interval and said bit interval.

11. The apparatus of claim 10, wherein the decoded sample streams consist of samples separated by respectively different intervals in the incoming sample stream.

12. The apparatus of claim 10, wherein said determining includes, for each of the decoded sample streams, attempting to decode the received transmission from the decoded sample stream.

13. The apparatus of claim 12, wherein said attempting includes performing decoding with respect to each of the decoded sample streams in parallel.

14. The apparatus of claim 12, wherein the received transmission is a transmission on a Controller Area Network (CAN) bus, and said attempting utilizes de-stuffing and cyclic redundancy code (CRC) checking.

15. The apparatus of claim 10, wherein said relative variations are associated with variation in said sampling interval.

16. The apparatus of claim 10, wherein said relative variations are associated with variation in said bit interval.

17. The apparatus of claim 10, wherein said relative variations are associated with variations in both said sampling interval and said bit interval.

18. An apparatus for processing a received transmission of bits that are temporally separated by a bit interval, comprising:
- a sample clock input for receiving an oversampling clock whose frequency defines a sampling interval that is smaller than said bit interval, wherein said bit interval is nominally a predetermined integer multiple of said sampling interval;
- a receiver coupled to said sample clock input and configured to sample the received transmission in accordance with said sampling interval to produce an incoming sample stream;
- a plurality of processing fingers coupled in parallel to said receiver, each said finger including a respective decoder coupled to said receiver and configured for decoding the incoming sample stream to produce a decoded sample stream in which is provided only every jth sample of the incoming sample stream, wherein said decoders implement respectively different values of j; and
- each said finger including a respective processor coupled to the associated decoder and configured to determine whether the received transmission is decodable from the associated decoded sample stream by attempting to decode the received transmission from the associated decoded sample stream, wherein the received transmission is a transmission on a Controller Area Network (CAN) bus, and said attempting utilizes de-stuffing and cyclic redundancy code (CRC) checking.

* * * * *